United States Patent [19]
Boehringer et al.

[11] Patent Number: 5,701,801
[45] Date of Patent: Dec. 30, 1997

[54] MECHANICALLY REDUNDANT ACTUATOR ASSEMBLY

[75] Inventors: Wilfred E. Boehringer, Fullerton; Teunes Verhoeven; William V. Hutz, both of Long Beach, all of Calif.

[73] Assignee: McDonnell Douglas Corporation, Huntington Beach, Calif.

[21] Appl. No.: 544,952

[22] Filed: Oct. 18, 1995

[51] Int. Cl.⁶ ........................................... F16J 15/18
[52] U.S. Cl. ........................................... 92/166
[58] Field of Search ........................... 92/166, 172

[56] References Cited

U.S. PATENT DOCUMENTS

| | | | |
|---|---|---|---|
| 476,620 | 6/1892 | Fellows | 92/166 X |
| 3,363,515 | 1/1968 | Fuell et al. | 92/166 X |
| 3,593,620 | 7/1971 | Foerster et al. | |
| 3,878,764 | 4/1975 | Zech | |
| 3,933,176 | 1/1976 | Wheeler | |
| 4,112,824 | 9/1978 | Krause | |
| 4,178,838 | 12/1979 | Stafford | 92/166 X |
| 4,521,707 | 6/1985 | Baker | |
| 4,530,271 | 7/1985 | Cronin | |
| 4,531,447 | 7/1985 | Barnes | 91/384 |
| 4,699,043 | 10/1987 | Violante De Dionigi | 91/182 |
| 4,736,675 | 4/1988 | Stoll | |

OTHER PUBLICATIONS

Aerospace Engineering article Jun. 1992 747–400 Upper Rudder Control System.

*Primary Examiner*—F. Daniel Lopez

*Attorney, Agent, or Firm*—Bell, Seltzer, Park & Gibson, P.A.

[57] ABSTRACT

In a mechanically redundant actuator system, the actuator has a structurally redundant members for attaching it between a stationary anchor point to a movable control surface. Specifically the actuator consists of a cylinder body, a double action piston with a piston rod attached to the control surface at one end and a swivel bar at the other end. Single or multiple tie rods are attached between the swivel bar and the movable control surface. Each tie rod can withstand one half the load of the piston rod. Also, trunnion links attach the cylinder body to the structure. Each trunnion links can withstand the full limit load with or without any load factors. The trunnion fittings can be any configuration that provides a structural reaction, and provides a dual load path and freedom of movement in at least two axes. At least two of these actuator units are required per surface. Also, a dual tandem control valve with a hydraulic compensator for each actuator is required. With this arrangement, the failure modes allowable are latent mechanical failure of the mechanical links in addition to the total failure of any actuator in combination with any inoperative condition in the hydraulic power system. Various arrangements of the basic system are contemplated within the scope of this invention and include the tail end of each actuator's piston rod connected to a swivel beam. This beam is also connected to the control surface with one or more connecting rods. Each actuator is supported by a trunnion, whether directly connected to the cylinder or otherwise and the trunnion must be able to react to full surface hinge moments.

18 Claims, 5 Drawing Sheets

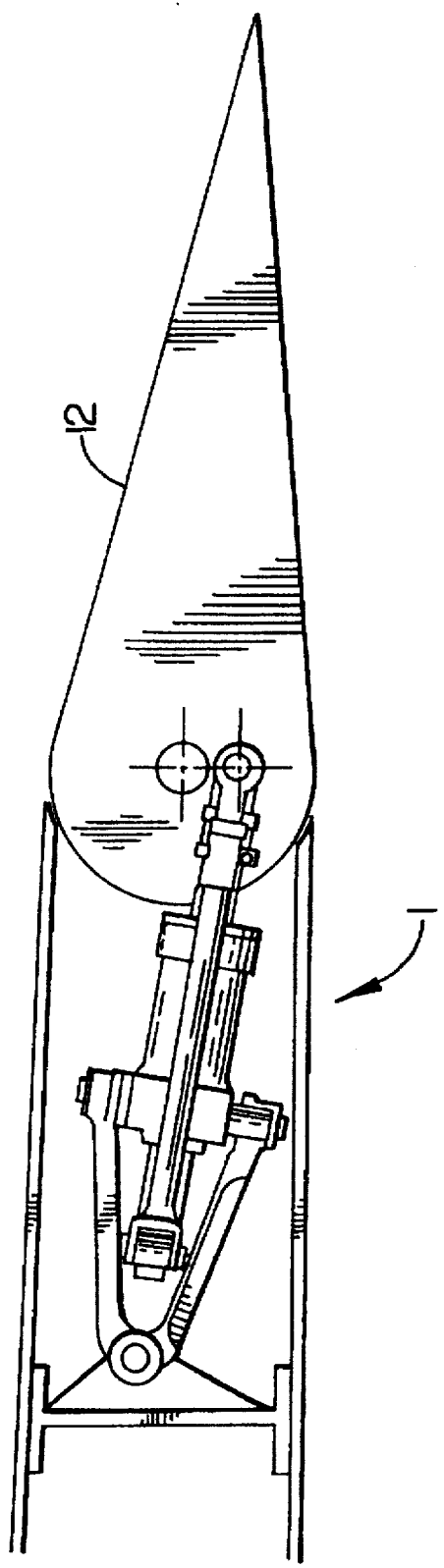

MECHANICALLY REDUNDANT ACTUATOR ASSEMBLY

BACKGROUND OF THE INVENTION

1. Field of the Invention

The present invention relates to the provision of a highly fault-tolerant servo actuator system for an aircraft, utilizing redundant actuator systems, and redundancy management techniques. More particularly, the present invention relates to the provision of multiple actuator pairs and single or multiple tie rod interconnections for supplemental redundancy.

2. Description of Related Art

Almost all contemporary transport aircraft employ control surfaces that are fully powered. This means that hydraulically powered servo actuators supply the power to move the surfaces. Servo control is via mechanical linkage from the crew station to the actuators, by electrical signals from cockpit controllers or from the autopilot command servos to the actuators. Although the surfaces are controlled by hydraulic actuators, most, if not all of them are statically balanced about the pivot axis or the hinge line using balance weights to prevent structural damage due to surface flutter in the event the control surface becomes disconnected from the actuators or hydraulic power is lost.

There has been a reluctance to manufacture aircraft without balance weights on control surfaces because surface flutter causes destruction of the control surface and is a catastrophic event in most cases. However, due to the use of fly-by-wire control systems, new aircraft now being produced omit the balance weights and incorporate active electronic monitoring, pre-flight checks, and maintenance checks in order to meet the safety requirements.

The term "Fly-By-Wire" as used herein is the name given to a control system in which control commands of a pilot are transformed into electrical signals which are transmitted to the actuators which are connected to the control surfaces. The term "control surfaces" refers to movable aerodynamic surfaces which are operable for control of the aircraft to enable pitch roll and yaw maneuvers of the aircraft and in some cases, change the aerodynamic characteristics of the air foil. Safety is a major concern in the aircraft industry and the regulatory agencies. Certain statistical criteria is set forth in FAR/JAR part 25 regulations, which set the minimum safety requirements of various redundant systems.

However, to save many hundreds of pounds of weight on new and derivative aircraft and meet the safety requirements without additional maintenance or crew action, some other technique is required.

The safety requirement which must be met, requires that the probability of a free, undamped, control surface motion will be extremely improbable that is to say ($10^{-9}$). In addition, a reasonable inspection interval should be at least 10,000 flight hours between hardware inspections. Inspections are required to be sufficient to uncover any latent failures. Also, force contention between parallel installed hydraulic actuators was to be limited or eliminated.

At present, there are several known methods that are used to permit omission of the balance weights from control surfaces. One such system is to install three actuators in a parallel arrangement. This configuration can produce force contention between the actuators at different locations on the control surface, and the resulting stresses can result in control surface structure fatigue and ultimate failure of the control surface or significant strengthening of the structure is required in order to accept the loads. To reduce this force contention, computer monitored pressure sensors were added to monitor the actuators to permit servo operation of the two or three actuator pressures to cause actuator positions to be more closely aligned. This method is less than ideal. To minimize the force contention and performance problems, one system for rudder control provides a configuration of three parallel actuators controlled by a common in-line, three hydraulic system control valve This is expensive and difficult to manufacture. Another method is to install dual simplex actuators to each surface, and allow the fly-by wire computers to monitor actuator status as well as other operational checks needed for safety. However, this method is only available for derivative aircraft which already employ fly-by-wire capability.

SUMMARY OF THE INVENTION

The disclosed invention provides a power actuator configuration which meets the above mentioned requirements. This is accomplished by providing triple redundant mechanical elements to each control surface, in combination with dual redundant hydraulic power having damping mode capability upon loss of pressure. Such actuators in the configurations shown can tolerate a latent mechanical failure in combination with a hydraulic system failure, thus meeting the $10^{-9}$ failure probability with a reasonable inspection interval.

The surface actuator disclosed herein solves the above identified problems, without requiring the configuration to be fly-by-wire. Also only 2 actuators per surface are required. This system is an advantage over prior relevant art systems because it allows hydraulic system separation without additional hydraulic equipment. Actuator force contention and surface frequency response are resolved by the use of a dual hydraulic system tandem valve instead of mechanically connecting multiple mechanical inputs to control a flight control surface, as with the multiple servo actuator configuration.

The instant invention comprises a mechanically redundant actuator which includes structurally redundant members which attach the actuator body between a stationary anchor point and a movable control surface.

Specifically, the actuator consists of a cylinder body, a double action piston "received by the cylindrical channel of said body," with a piston rod attached to the control surface at one end and a swivel bar at the other end. Two tie rods are attached between the swivel bar and the movable control surface. Each tie rod can withstand one half the load of the piston rod. Also, trunnion links attach the cylinder body to the structure. Each trunnion link can withstand the full limit load without failure. The trunnion fittings can be any configuration that provides a structural reaction, and provides a dual load path and freedom of movement in at least two axes.

To meet the safety requirement, at least two of these actuator units are required per surface. Also, a dual tandem control valve with a hydraulic compensator for each actuator is required. With this arrangement, the failure modes allowable are latent mechanical failure of the mechanical links in addition to the total failure of any actuator in combination with any inoperative condition in the hydraulic power system. Various arrangements of the basic system are contemplated within the scope of this invention and include the tail end of each actuator's piston rod connected to a swivel beam. This beam is also connected to the control surface with one or more connecting rods. Each actuator is supported by a trunnion, whether directly connected to the cylinder or otherwise and the trunnion must be able to react to full surface hinge moments.

This surface actuator arrangement can be used on any aircraft control surface. It is particularly suitable for a movable control surface which is not statically balanced and which must meet the safety standard of the FAR/JAR part 25.

The objects of this invention are as follows:

To provide a structurally redundant control surface actuator configuration that tolerates a latent failure and any combination of dual failures mechanical and/or hydraulic without disconnection from the control surface;

a control surface actuator arrangement that provides the required system safety standard for balance weight removal, using only two actuators; and a control surface arrangement that requires no balance weights with negligible "force contention" between hydraulic cylinder output forces (the difference in force output of each cylinder based an equal travel.)

BRIEF DESCRIPTION OF THE DRAWINGS

FIG. 2A and 2B is an orthographic view of a dual hydraulic cylinder multiple tie rod system.

DESCRIPTION OF THE PREFERRED EMBODIMENT(S)

Figure 1:
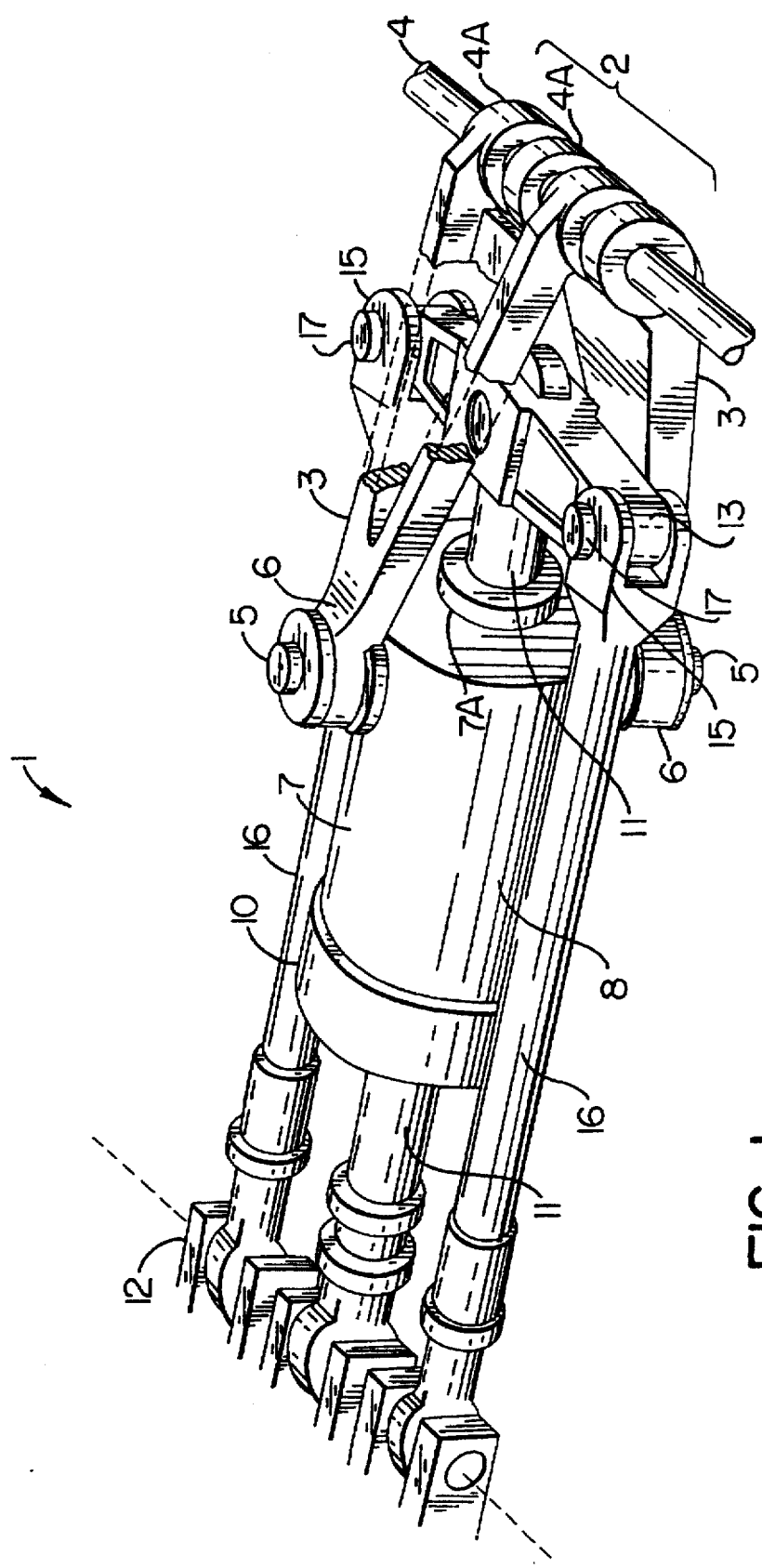
FIG. 1 is a perspective view of the basic trunnion, hydraulic cylinder, swivel bar and tie rods.

With reference to FIG. 1, the mechanically redundant actuator assembly 1 has a pair of trunnion links 2 which have redundant structural links 3 for rotatable attachment to the air frame or other structural anchor point 4 at one end 5 and are rotatably attached at the other end 6 to the hydraulic cylinder 7 of an actuator 8 of the actuator assembly 1 at the barrel 7a of said cylinder 7. Each of the trunnion links 3 is designed to carry full limit load without any companion link. The trunnion links 3 form a generally "Y" shaped structure rotatably attached to opposite ends of pinion 5 attached to either side of the cylinder 7 of the actuator 8 of the actuator assembly 1.

Figure 2A:
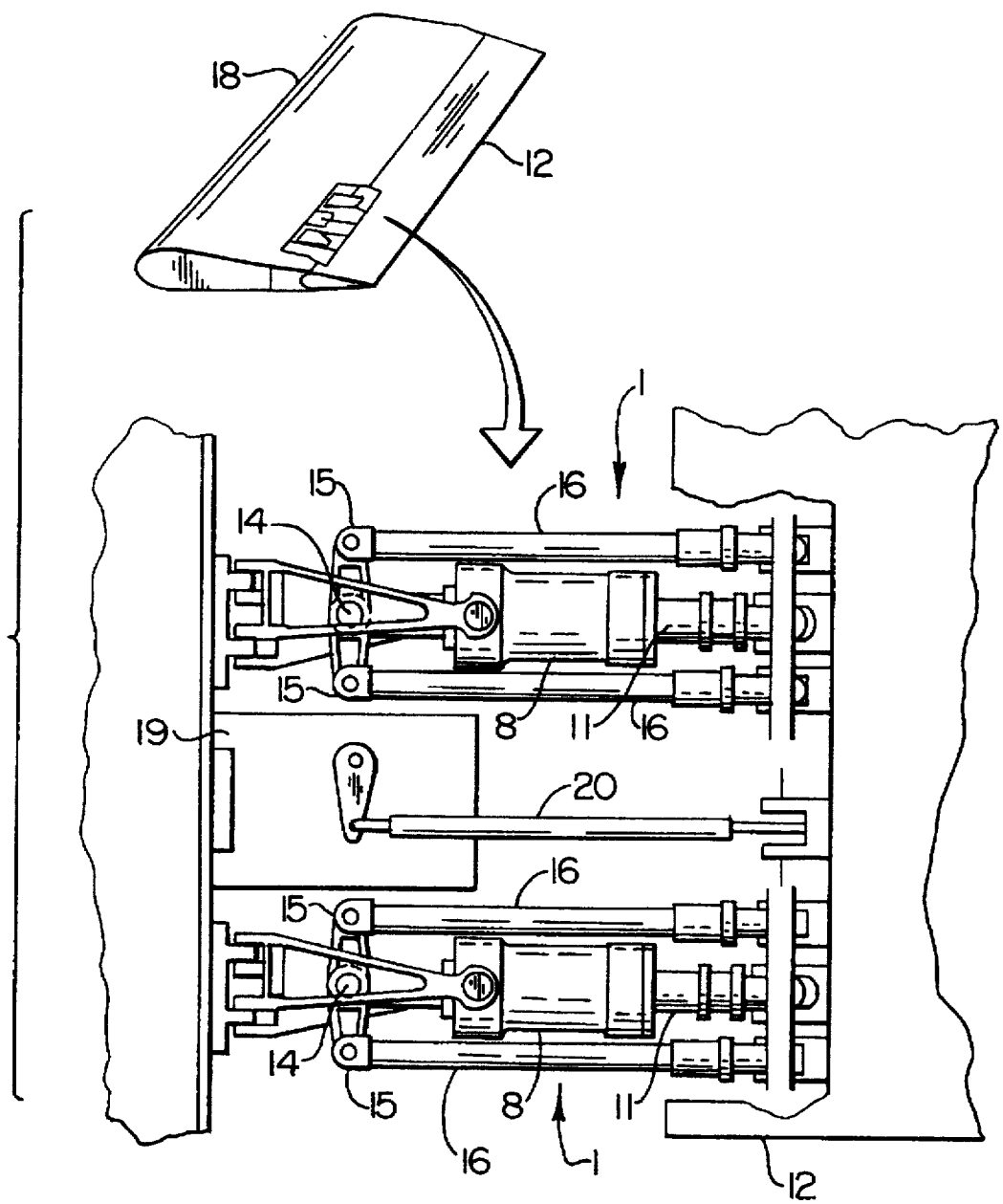

The actuator 8 has a double action type central piston received by a cylinder channel (not shown) inside cylinder 7 which permits displacement in either direction as is well known in the art. In particular, the central piston is disposed within a channel defined by the cylinder 7 and is adapted for displacement along the longitudinal axis of the channel. The cylinder 7 has an end cap 10 and gland 7a having holes for receiving a piston rod 11 attached to said piston which piston rod 11 passes through each end of the cylinder 7 and the end cap 10 and gland 7a. The piston rod 11 of the actuator 8 is designed to carry at least the full load limit required to actuate a movable control surface 12 although typically some load limit safety factor is built in. Suitable materials for designing such actuator 8 within such load limit are well known in the art. The end of piston rod 11 opposite the end connected to the control surface is rotatably attached to the center of a cross or swivel bar 13 through an axle 14 which can be better seen in FIG. 2A. The opposite ends of the swivel bar 13 are attached to the clevis 15 of tie rods 16 through an axle 17 which permits rotation about said axle 17. Each of the tie rods 16 are disposed so that the longitudinal axis of each is substantially parallel to the piston rod 11 of the actuator 8. Each of the tie rods 16 is designed to carry one-half the load limit required to actuate the control surface 12. The end of piston rod 11 attached to the movable control surface 12 and each end of the tie rods 16 opposite to the end attached to the swivel bar 13 are rotatably attached to the movable control surface 12 in the usual manner known in the art and offset from the point of attachment of the movable control surface 12 to the airframe as shown in FIG. 2B so that actuation of the actuator assembly 1 in either direction causes rotation of the movable control surface 12 about its point of attachment as shown in FIG. 2B.

With reference to FIG. 2, which shows a portion of a wing 18, the moveable control surface 12 is provided with a pair of actuator assemblies 1 disposed about a tandem valve manifold 19 and a feedback push-rod 20 with which the movable control surface 12 position can be determined. In the event that any particular tie rod 16 or piston rod 11 should fail, both actuator assemblies 1 will continue to operate as before. In the event an entire actuator assembly 1 shall fail the remaining actuator assembly 1 will provide continued service within design load limits.

Figure 3:
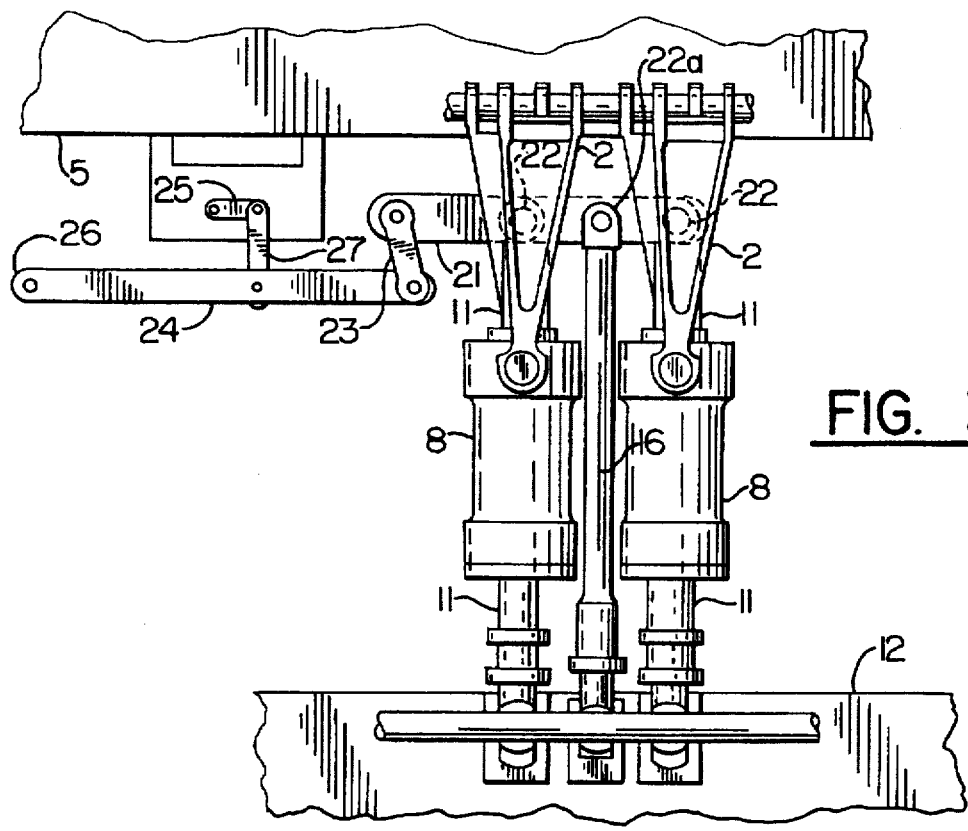
FIG. 3 is a top down view of a dual hydraulic cylinder and single tie rod system.

FIG. 3 shows an alternative actuator assembly 1 with a modified swivel bar 21. The swivel bar 21 is rotatably attached to two actuators 8 at an axle 22 at the end of the push rod 11 and has a single tie rod 16 rotatably attached thereto at an axle 22a and disposed between the two piston rods 11 of the two actuators 8. In this embodiment the two tie rods 16 for each actuator assembly 1 are replaced with a single tie rod 16 due to the presence of the redundant piston rods 11. The swivel bar 21 is extended on one side thereof and is connected to linkage 23 which provides the feedback motion of swivel bar 21. Linkage 23 connects to one end of link 24 which is rotatably anchored at one end 26 to command input push rod at ground 5 and is rotatably attached to a push rod or feedback link 27 which operates a crank 25 mounted on the control valve & manifold at a point intermediate between the connection to link 23 and the anchor point 26 for detection of the position of the control surface. Thus, when an actuator assembly 1 operates, this linkage actuates the feedback push rod as described in FIG. 2. If any of the piston rods 11 should fail between the cylinder 7 and the control surface 12, the system will continue to operate. In this instance the tie rod 16 provides an additional margin of safety over the load limit design of the piston rod 11 alone required to actuate the movable control surface 12. Even if both pistons rods are fractured at or become disconnected from the control surface 12. The load limit capacity of the connecting rod 16 is sufficient to operate the control surface 12 within designed load limit because the swivel bar 21 continues to operate the connecting rod 16.

Figure 4:
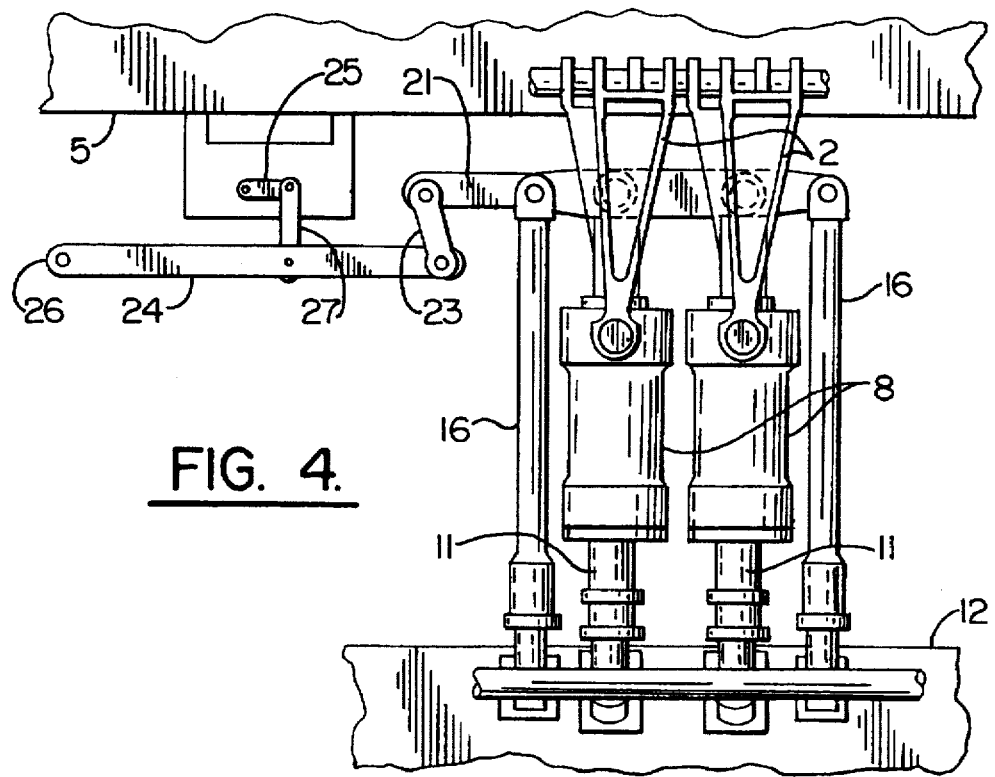
FIG. 4 is a top down view of a dual hydraulic cylinder and multiple tie rod system.

In FIG. 4, an additional configuration for the actuator assembly 1 is shown which includes two tie rods 16 as before with an additional actuator 8. In this case, the swivel bar 21 has an additional point of attachment for the additional actuator 8. The balance of the linkage is as shown in FIG. 3, except that the tie rods 16 are disposed on either side of actuators 8. Since the tie rods 16 and the pistons 11 are all attached to the same rotational axis of the movable control surface 12, placement of the tie rods 16 or cylinders 7 in any particular order will not affect the operation of the invention. Additional tie rods 16 or actuators 8 may be added to increase the redundancy.

Finally, should the entire hydraulic system fail, the actuator assembly 1 is augmented with redundant hydraulic valves and compensators to prevent flutter.

Figure 5:
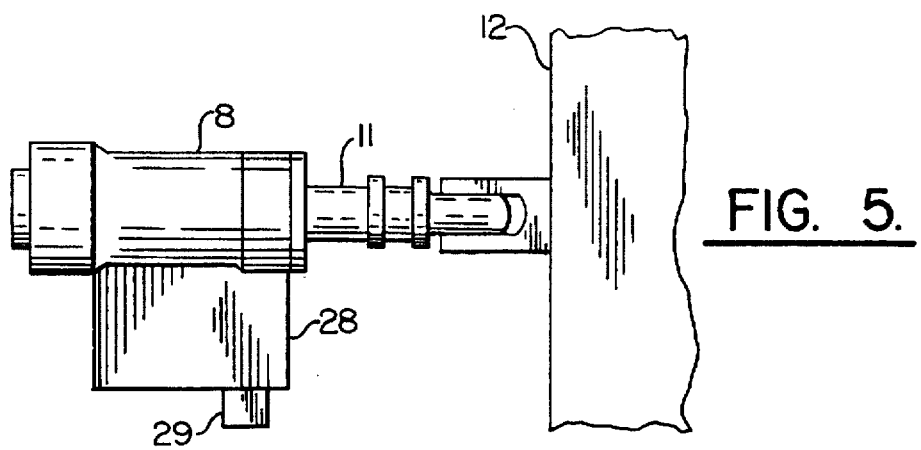
FIG. 5 is a schematic view of the actuator system showing a simplex-simplex valve with compensation.
Figure 6:
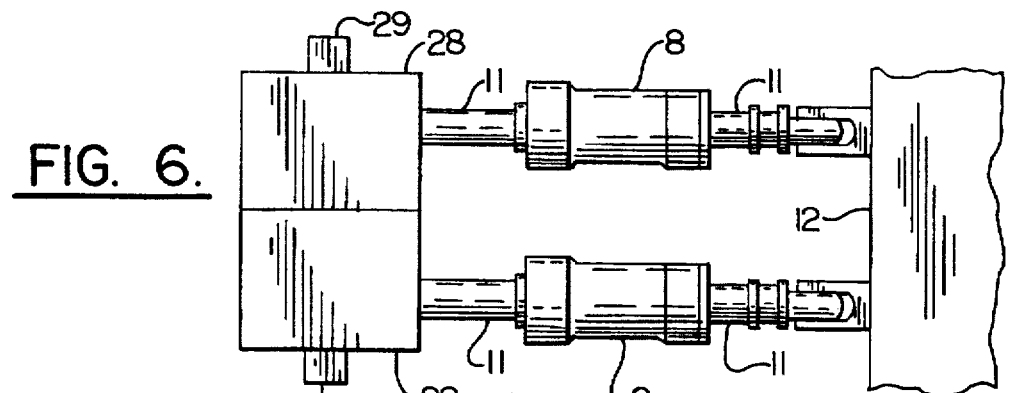
FIG. 6 is a schematic view of the actuator system showing dual valves with compensation.
Figure 7:
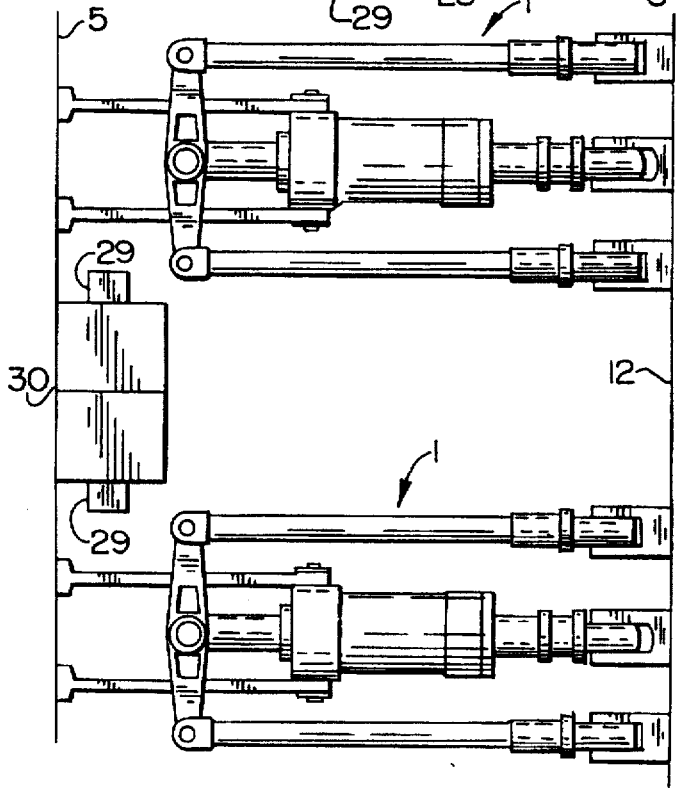
FIG. 7 s a schematic view of the first described actuator assembly in a dual form with compensation.

FIGS. 5 and 6 shows single actuator assembly system and dual simplex actuator assembly solutions for loss of actuator control. In FIG. 5, a simplex actuator 8 is shown attached to the control surface 12 having a single hydraulic valve 28 and a compensator 29. The compensator maintains the hydraulic fluid in the actuator assembly. This preserves the actuator as a damper and prevents the surface from fluttering. Such hydraulic valves and compensators are well known in the art. FIG. 6 shows a dual simplex version using a tandem hydraulic valve. In this particular case, each of the actuators 8 is driven by the tandem hydraulic valves 28 each with its own compensator 29 and force contention between the two actuators 8 is eliminated. If ether of the valves should fail, the other valve can drive the actuators 8. If both valves fail, the compensators will prevent total loss of hydraulic fluid and prevent flutter. In another preferred embodiment shown in FIG. 7, the initially described actuator assembly 1 is shown in schematic form attached between a control surface 12 and the air frame 5 having a dual simplex assemblage with a tandem valve 30 and compensators 29. This simplified assemblage meets the required safety margins in view of possible hydraulic and mechanical failures with minimal use of hydraulic actuator elements.

Having thus described the invention what is claimed is:

1. A mechanically redundant actuator comprising:
   a. at least one actuator body, having an elongated channel along at least one axis of said body,
   b. a piston received by said channel, said piston longitudinally displaceable along the longitudinal axis of said channel in said actuator body,
   c. a connector attaching said actuator body to an anchor point,
   d. a piston rod attached to said piston of greater length than said channel and disposed substantially parallel to the longitudinal axis of said channel,
   e. a connector attaching one end of said piston rod to a movable surface,
   f. a cross bar connected to the end of said piston rod opposite said movable surface,
   g. a plurality of tie rods rotatably connected at one end to said cross bar, and
   h. a connector attaching said plurality of tie rods, at an end opposite said cross bar, to said movable surface.

2. A mechanically redundant actuator as described in claim 1 wherein the cylinder body is provided with an end cap which encloses one side of said channel and a supporting piston gland which encloses said piston and wherein said end cap and gland each have openings for receiving an end of the piston rod and permit each such end to extend through said respective end cap and gland.

3. A mechanically redundant actuator as described in claim 2 wherein said means for anchoring said actuator body to a stationary surface comprises:
   a. at least one trunnion link rotatably attached to the stationary surface at one end and adapted to permit rotation along a first axis transverse to the axis of said piston rod, and rotatably attached to said actuator body at the other end and adapted to permit rotation along an axis transverse to the axis of said piston rod and transverse to said first axis.

4. A mechanically redundant actuator as described in claim 3 wherein there are at least two trunnion links each attached to said stationary surface at one end and attached on opposite sides to said actuator body at the other end.

5. A mechanically redundant actuator as described in claim 3 wherein each trunnion link is equal in strength to the piston rod, whereby should the piston rod fracture between the movable surface and the actuator body, the actuator will continue to operate and if any trunnion link should fracture between the stationary surface and the actuator body, the actuator will continue to operate.

6. A mechanically redundant actuator as described in claim 5 wherein the piston rod is greater in strength than any tie rod.

7. A mechanically redundant actuator system which includes at least one mechanically redundant actuator comprising:
   a. at least one actuator body, having an elongated channel along at least one axis of said body,
   b. a piston received by said channel, said piston longitudinally displaceable along the longitudinal axis of said channel in said actuator body,
   c. means for anchoring said actuator body to an anchor point,
   d. a piston rod attached to said piston of greater length than said channel and disposed substantially parallel to the longitudinal axis of said channel,
   e. means for anchoring one end of said piston rod to a movable surface,
   f. a cross bar connected to the end of said piston rod opposite said movable surface,
   g. a plurality of tie rods rotatably connected at one end to said cross bar, and
   h. means for anchoring said plurality of tie rods, at an end opposite said cross bar, to said movable surface.

8. A mechanically redundant actuator system as described in claim 7 wherein the cylinder body is provided with an end cap which encloses said channel with an integral end and a gland which encloses said piston and wherein said end cap and a gland each have openings for receiving an end of the piston rod and permit each such end to extend through said respective end caps.

9. A mechanically redundant actuator system as described in claim 8 wherein said means for anchoring said actuator body to a stationary surface comprises:
   a. at least one trunnion link rotatably attached to the stationary surface at one end and adapted to permit rotation along a first axis transverse to the axis of said piston rod, and rotatably attached to said actuator body at the other end and adapted to permit rotation along an axis transverse to the axis of said piston rod and transverse to said first axis.

10. A mechanically redundant actuator system as described in claim 9 wherein there are at least two trunnion links each attached to said stationary surface at one end and attached on opposite sides to said actuator body at the other end.

11. A mechanically redundant actuator system as described in claim 10 wherein the strength of the trunnion links in the aggregate is at least substantially equal in strength to the piston rod, whereby should the piston rod fracture between the movable surface and the actuator body, the actuator will continue to operate and if any trunnion link should fracture between the stationary surface and the actuator body, the actuator will continue to operate.

12. A mechanically redundant actuator system as described in claim 11 wherein there are at least two actuators attached in parallel to said stationary surface and said movable surface.

13. A mechanically redundant actuator system as described in claim 12 wherein the piston rod is greater in strength than any tie rod.

14. A mechanically redundant actuator system which includes at least one mechanically redundant actuator comprising:

a. at least one actuator body, having an elongated channel along at least one axis of said body,
  b. a piston received by said channel, said piston longitudinally displaceable along the longitudinal axis of said channel in said actuator body,
  c. at east one trunnion link rotatably attached to an anchor point at one end and adapted to permit rotation along a first axis transverse to the axis of said piston rod, and rotatably attached to said actuator body at the other end and adapted to permit rotation along an axis transverse to the axis of said piston rod and transverse said first axis.

15. A mechanically redundant actuator system as described in claim 14 wherein there are at least two trunnion links each attached to said stationary surface at one end and attached on opposite sides to said actuator body at the other end.

16. A mechanically redundant actuator system as described in claim 14 wherein there are at least two actuators attached in parallel to said stationary surface and said movable surface.

17. A mechanically redundant actuator system as described in claim 16 further comprising a tandem valve for operating said actuators and a compensator for each valve of said tandem valve, whereby on operation said tandem valve will compensate for force contention between said hydraulic actuators through said compensators.

18. A mechanically redundant actuator system as described in claim 15 wherein the strength of the trunnion links in the aggregate is at least substantially equal in strength to the piston rod, whereby should the piston rod fracture between the movable surface and the actuator body, the actuator will continue to operate and if any trunnion link should fracture between the stationary surface and the actuator body, the actuator will continue to operate.

* * * * *

UNITED STATES PATENT AND TRADEMARK OFFICE
CERTIFICATE OF CORRECTION

PATENT NO. : 5,701,801
DATED : December 30, 1997
INVENTOR(S) : Boerhring et al.

It is certified that error appears in the above-identified patent and that said Letters Patent is hereby corrected as shown below:

On the title page, column 1, in the Inventors' Names, "Huntz" should be -- Mutz--.

On the title page, column 2, in the Abstract, line 2, omit "a".

On the title page, column 2, in the Abstract, line 11, "links" should be --link--.

Column 1, line 42, after "pitch" insert a comma (,).

Column 2, line 9, after "valve" insert a period (.).

Column 2, lines 45-26, omit the quotation marks.

Column 3, line 26 "Fig. 2A and 2B "is an" should be --Figs. 2A and 2B are--.

Column 3, line 26, "view" should be --views--.

Column 3, line 56, "cylinder" should be --cylindrical--.

Column 4, line 8, "are" should be --is--.

Column 4, line 22, "moveable" should be --movable-- (for consistency).

Column 4, line 45, "&" should be --and--.

Column 4, line 55, "pistons" should be --piston--.

UNITED STATES PATENT AND TRADEMARK OFFICE
CERTIFICATE OF CORRECTION

PATENT NO. : 5,701,801

DATED : December 30, 1997

INVENTOR(S) : Boerhring et al.

It is certified that error appears in the above-identified patent and that said Letters Patent is hereby corrected as shown below:

Column 4, line 56, "12.The" should be --12, the--.

Column 5, line 9, "shows" should be --show--.

Column 4, line 21, "ether" should be --either--.

Column 7, line 18, "east" should be --least--.

Column 7, line 23, after "transverse" insert --to--.

Column 7, line 24, after "axis" the period (.) should be a comma (,).

d. a piston rod attached to said piston of greater length than said channel and disposed substantially parallel to the longitudinal axis of said channel,

UNITED STATES PATENT AND TRADEMARK OFFICE
CERTIFICATE OF CORRECTION

PATENT NO. : 5,701,801
DATED : December 30, 1997
INVENTOR(S) : Boerhring et al.

It is certified that error appears in the above-indentified patent and that said Letters Patent is hereby corrected as shown below:

d. a piston rod attached to said piston of greater length than said channel and disposed substantially parallel to the longitudinal axis of said channel,
e. means for anchoring one end of said piston rod to a movable surface,
f. a cross bar connected to the end of said piston rod opposite said movable surface, and
g. at least one tie rod rotatably connected to one end to said movable surface and rotatably connected to said cross bar at the other.

Signed and Sealed this

Fourth Day of August, 1998

Attest:

BRUCE LEHMAN

Attesting Officer

Commissioner of Patents and Trademarks